(12) United States Patent
Anderson et al.

(10) Patent No.: US 7,467,092 B2
(45) Date of Patent: Dec. 16, 2008

(54) SYSTEMS AND METHODS FOR THE PREVENTION OF EXTENDED UTILITY THEFT

(75) Inventors: Michael Anderson, Atlanta, GA (US); Anthony Anderson, Dacula, GA (US); Rob Keith Johnson, Sharpsburg, GA (US); Brian King, Atlanta, GA (US)

(73) Assignee: Blu Trend, LLC, Duluth, GA (US)

( * ) Notice: Subject to any disclaimer, the term of this patent is extended or adjusted under 35 U.S.C. 154(b) by 0 days.

(21) Appl. No.: 11/768,739

(22) Filed: Jun. 26, 2007

(65) Prior Publication Data

US 2007/0244713 A1 Oct. 18, 2007

Related U.S. Application Data

(63) Continuation of application No. 11/747,752, filed on May 11, 2007, now abandoned, and a continuation of application No. 11/670,164, filed on Feb. 1, 2007, now abandoned, and a continuation of application No. 11/404,221, filed on Apr. 14, 2006, now abandoned.

(51) Int. Cl.
*G06Q 99/00* (2006.01)

(52) U.S. Cl. ......................................................... 705/1

(58) Field of Classification Search ........................ 705/1
See application file for complete search history.

(56) References Cited

U.S. PATENT DOCUMENTS

| 5,184,119 | A | 2/1993 | Stanbury et al. |
| 5,684,965 | A | 11/1997 | Pickering |
| 6,334,107 | B1 | 12/2001 | Gale et al. |
| 2003/0093289 | A1 | 5/2003 | Thornley et al. |
| 2003/0200107 | A1 | 10/2003 | Allen et al. |
| 2004/0138896 | A1 | 7/2004 | Cheng |
| 2005/0102152 | A1 | 5/2005 | Hodges |
| 2005/0144028 | A1 | 6/2005 | Donahue et al. |
| 2006/0000890 | A1 | 1/2006 | Nakajima |
| 2006/0045105 | A1 | 3/2006 | Dobosz et al. |
| 2006/0074802 | A1 | 4/2006 | Hall et al. |

*Primary Examiner*—Jonathan Ouellette
(74) *Attorney, Agent, or Firm*—Sutherland Asbill & Brennan LLP

(57) ABSTRACT

Systems, methods, and computer program products for identifying utility theft include a property management system operable to receive tenant data associated with a property. A service provider in communication with the property management system receives the tenant data from the property management system via a network such as the Internet, where the tenant data identifies a tenant responsible for payment of a utility service associated with a utility service account. The service provider, which may be a utility, compares the tenant data to utility data to determine if the tenant corresponds to a utility service account. A notification module provides one or more alerts identifying when the tenant fails to correspond to the utility service account.

19 Claims, 16 Drawing Sheets bluTrend

Monday - December 20, 2005     You have 4 Alerts     Logoff

Search

- Property 2
  - Building A
    - Unit 1101
    - Unit 1102
    - Unit 1103
    - Unit 1104
    - Unit 1105
    - Unit 1201
    - Unit 1202
    - Unit 1203
    - Unit 1204
  - Building B
  - Building C
  - Building D
  - Building E Action | Property Info | Reports
Not Switched | Early Switch

Issues for Shadow Valley

| Unit / Bldg | Resident | Move-In | Switch Date | Recovery Days | Recovery Expense | Current Status | Notices | Ignore | Shut Off |
|---|---|---|---|---|---|---|---|---|---|
| 2506 / B | Creel, William | 11/28/2005 | | 22 | $154 | Shut-Off Requested | 3rd (12/18) | ☐ | ○ |
| 1104 / A | Rodriguez, Eduado | 11/30/2005 | 12/22/2005 | 20 | $140 | Switch Pending | 3rd (12/19) | ☐ | ☐ |
| 2303 / B | Gross, Patricia | 12/1/2005 | | 19 | $133 | | 2nd (12/15) | ☐ | ☐ |
| 2405 / B | Jones, James | 12/1/2005 | | 19 | $133 | | | ☐ | ☐ |
| 2103 / B | Handwick, Cynthia | 12/1/2005 | 12/20/2005 | 18 | $126 | Switch Pending | 2nd (12/15) | ☐ | ☐ |
| 2610 / B | Lopez, Maya | 12/5/2005 | | 7 | $49 | Canceled Switch | 2nd (12/16) | ☐ | ☐ |
| 1409 / A | Robertson, Holly | 12/13/2005 | 12/15/2005 | 6 | $42 | Switch Pending | 1st (12/20) | ☐ | ☐ |
| 1108 / A | Global Services, LLC | 12/14/2005 | | 5 | $35 | In Grace Period | | ☐ | ☐ |
| 2501 / B | Takemoto, Rie | 12/15/2005 | | | | | | ☐ | ☐ |

510     500     530     520

FIG. 5 bluTrend

Monday - December 20, 2005 You have 4 Alerts    Logoff

Search

- Property 2
  - Building A
    - Unit 1101
    - Unit 1102
    - Unit 1103
    - Unit 1104
    - Unit 1105
    - Unit 1201
    - Unit 1202
    - Unit 1203
    - Unit 1204
  - Building B
  - Building C
  - Building D
  - Building E

| Action | Property Info | Reports |
| Not Switched | Early Switch |

Issues for Shadow Valley

| Unit / Bldg | Resident | Switch Date | Move-Out | Reckoner Days | Reckoner Expense | Current Status | Notices | Ignore | Shut Off |
|---|---|---|---|---|---|---|---|---|---|
| 2350E / B | Creel, William | 12/15/2005 | 4/15/2006 | 5 | $42 | Shut-Off Requested | 3rd (12/18) | ☐ | ☐ |
| 1104 / A | Rodriguez, Eduardo | 12/19/2005 | | | | | 3rd (12/19) | ☐ | ☐ |
| 2303 / B | Gross, Patricia | 12/20/2005 | 12/31/2005 | 7 | $7 | 20 Day MO Gap | 2nd (12/15) | ☐ | ☐ |
| 2405 / B | Roberts, Susan | 12/20/2005 | 1/15/2006 | 0 | $0 | > 30 Day MO Gap | 2nd (12/15) | ☐ | ☐ |
| 2103 / B | Hardwick, Cynthia | 12/31/2005 | 1/15/2006 | 0 | $0 | 16 Day MO Gap | 1st (12/10) | ☐ | ☐ |
| 2610 / B | Lopez, Maye | 12/31/2005 | 1/1/2006 | 0 | $0 | 1 Day MO Gap | | ☐ | ☐ |
| 1409 / A | Robertson, Holly | 1/1/2006 | 12/1/2006 | 0 | $0 | > 30 Day MO Gap | | ☐ | ☐ |

View as Report

| Company: | Red River Property Management |
|---|---|
| Property: | Shadow Valley |

Unit Number: 1101    Building Number: B

Market ID: 11393219238239292    [Link]

Addresses:

| Street / P.O. Box # | Additional Address | City | State | Zip | Primary | Type |
|---|---|---|---|---|---|---|
| 9483 Palmetto Way | 101 | Houston | TX | 00000-0000 | Yes | Physical Location |
| 9490 Palmetto Way Unit 101 | | Houston | TX | 00000-0000 | No | Service Location |

[Edit] [Add] [Delete]

[Add Unit] [Save Unit]

Red River Property Management – Shadow Valley

Unit: 1103   Building: A

Russett, Chad

Unit Status: Occupied
Last Status: Move-In Switch OK
Last Switch: 4/10/2004 (to resident)

| Resident | Type |
|---|---|
| Creel, William | Move-In |
| Rodriguez, Eduado | Move-In |
| Gross, Patricia | Move-In |
| Jones, James | Move-In |
| Hardwick, Cynthia | Move-In |
| Lopez, Maya | Move-In |
| Robertson, Holly | Move-In |
| Global Services, LLC | Early Disc. |
| Takemoto, Rie | Early Disc. |
| | |
| | |
| | |

Red River Property Management – Shadow Valley

You are requesting the electric service to be disconnected for the following units. Are you sure you want them disconnected. Check the records you would like disconnected.

| Unit / Bldg | Resident | Type | Days | Status | Disconnect |
|---|---|---|---|---|---|
| 1107 / A | Chesser, Tiffany | Early Disc. | 10 | Early Disconnect | ✓ |
| 2303 / B | Gross, Patricia | Move-In | 19 | | |
| 2405 / B | Jones, James | Move-In | 19 | | ✓ |

Process

FIG. 14

1400 bluTrend

Monday - December 20, 2005

You have 4 Alerts    Logoff

Tabs: Dashboard | Company Info | Reports
Sub-tabs: Summary | Not Switched | Early Switch

Red River Property Management Property Rankings

Last Month

| Property | (a) Offender Units | (b) Offender Days | (c=b/a) Offender Days/Units | (d) Offender Expense | (e=d/a) Offender Exp/Unit | (f) Closed | (g) Pending | (h) Switch Initiated | (i) Ignored | (j) Shut Off |
|---|---|---|---|---|---|---|---|---|---|---|
| Property A1 | 23 | 1104 | 48 | $5,961.60 | $259.20 | 17 | 3 | 2 | 1 | 0 |
| Property A2 | 11 | 506 | 46 | $2,580.60 | $234.60 | 7 | 2 | 1 | 0 | 1 |
| Property A3 | 42 | 1680 | 40 | $8,904.00 | $212.00 | 19 | 8 | 12 | 2 | 1 |
| Property A4 | 5 | 160 | 32 | $864.00 | $172.80 | 3 | 0 | 1 | 1 | 0 |
| Property A5 | 16 | 448 | 28 | $2,217.60 | $138.60 | 15 | 1 | 0 | 0 | 0 |
| Property A6 | 28 | 784 | 28 | $3,859.20 | $141.40 | 16 | 5 | 1 | 3 | 3 |
| Property A7 | 9 | 243 | 27 | $1,239.30 | $137.70 | 9 | 0 | 0 | 0 | 0 |
| Property A8 | 13 | 351 | 27 | $1,895.40 | $145.80 | 9 | 1 | 2 | 0 | 1 |
| Property A9 | 33 | 891 | 27 | $4,722.30 | $143.10 | 20 | 4 | 4 | 3 | 2 |
| Property A10 | 10 | 220 | 22 | $1,177.00 | $117.70 | 7 | 1 | 2 | 0 | 0 |
| Property A11 | 61 | 1098 | 18 | $5,599.80 | $91.80 | 36 | 7 | 6 | 8 | 4 |
| Property A12 | 1 | 16 | 16 | $79.20 | $79.20 | 0 | 0 | 1 | 0 | 0 |

View as Report

Navigation tree:
- Company ABC
  - Northeast
    - Property 1
    - Property 2
    - Building A
      - Unit 1101
      - Unit 1102
      - Unit 1103
      - Unit 1104
      - Unit 1105
      - Unit 1201
      - Unit 1202
      - Unit 1203
      - Unit 1204
    - Building B
    - Building C
    - Building D
    - Building E
    - Property 3
    - Property 4
    - Property 5
  - Northwest
  - Southern

SYSTEMS AND METHODS FOR THE PREVENTION OF EXTENDED UTILITY THEFT

FIELD OF THE INVENTION

The present invention relates to utilities, and more particularly to systems, methods, and computer program products that quickly identify and provide alerts to property owners when tenants fail to take responsibility for payment of utilities.

BACKGROUND OF THE INVENTION

Millions of rental units exist in the United States, such as in multifamily apartment complexes. Typically a utility service such as electricity and/or gas is always turned on at a multifamily unit. Always-on service is a result of impracticality and service fees for utility companies to turn on and shut off service to individual units. Unlike services that can be restored or disconnected remotely, such as cable and telecommunication services, electricity and gas companies have to physically send out personnel to perform such services, which is costly. Additionally, property owners often need utility services in vacant units for maintenance and to prevent build up of un-desirable odor due to lack of HVAC operation.

To permit always-on or continuous service, Continuous Service Agreements (CSAs) are used that authorize the transfer of payment responsibility from owners to move-in tenants or to the owner from a tenant on move out. In most cases, the tenants of the units are responsible for payment of utility services as provided in their lease agreements, which often require that a tenant contact their local utility on move-in to sign up for services. Under CSAs, until a tenant contacts a utility company after move-in, or after a tenant vacates a unit, the owners will typically be responsible for payment of utility services. Because the average turn over for tenants in multifamily units is high, the use of a CSA exposes property owners to a significant amount of utility-related expenses when a tenant moves out or fails to take responsibility for utility charges after move in. Although this problem applies to many multifamily units, the problem also exists for condos, leases, and other arrangements where a CSA exists and a non-owner tenant is responsible for utility service charges.

Currently, when a multifamily unit tenant fails to apply for a utility service under their name the property manager or owner will receive the utility bills for the occupied units, which may take 60 days or longer before the owner becomes aware that such situation even exists. The property manager or owner then must go through the tedious and complex task of matching bills for occupied units with tenants, which requires the correct information to permit a property manager to identify the tenants that owe money for utilities. This task is made even more difficult due to unit turnover because bills often apply to tenants within a particular unit months earlier. Often the situation goes un-noticed for months and results in loss of income for owners as owners and property managers have less ability to collect monies from tenants. Furthermore, in the event that tenants call their local utility company and ask for a disconnection of service under their name before moving out, owners can become prematurely responsible for utility expenses that should be paid by the tenant.

Therefore, what is needed is a system and method to that quickly identify when tenants fail to take responsibility for payment of utilities. It would also be beneficial for the system and method to alert unit owners and tenants that the tenant is receiving services for which the owner is incurring costs.

SUMMARY OF THE INVENTION

According to an embodiment of the present invention, the present invention includes software that matches a tenant move-in date into a unit with a tenant's request for service from a local utility company. The present invention identifies tenants that fail to sign up for utility service within a short timeframe chosen by the property owner via Internet-accessible graphical user interfaces, such as six (6) days, from their move-in date into a unit. Systems, methods and computer program products of the present invention permit alerts to be sent to tenants that fail to take responsibility for payment of utilities, and permit a property owner to send a report to a utility service when such situation exists to prevent further utility theft.

According to an embodiment of the invention, there is disclosed a system for identifying utility theft. The system includes at least one property management system operable to receive tenant data associated with a property, and a service provider in communication with the at least one property management system. The service provider is operable to receive the tenant data from the at least one property management system via at least one network, where the tenant data identifies at least one tenant responsible for payment of a utility service associated with a utility service account. The service provider is also operable to compare the tenant data to utility data to determine if the at least one tenant corresponds to a utility service account. The system further includes a notification module operable to provide one or more alerts identifying when the at least one tenant fails to correspond to the utility service account.

According to one aspect of the invention, the service provider is a utility service provider. According to another aspect of the invention, the system includes a utility service provider, in communication with the service provider, where the utility service provider is operable to transmit the utility data directly to the service provider. According to yet another aspect of the invention, the notification module is accessible, via a network, to an entity associated with the at least one property management system. The notification module can also be controlled, at least in part, by the entity associated with the at least one property management system.

The entity associated with the at least one property management system can configure the one or more alerts, including the timing of the one or more alerts. According to another aspect of the invention, the notification module can automatically provide the one or more alerts to an entity associated with the at least one property management system. Additionally, the notification module may automatically provide the one or more alerts to the service provider, to the utility service provider, and/or to the at least one tenant that fails to correspond to the utility service account. The notification module can include at least one internet accessible graphical user interface facilitating the configuration of the one or more alerts.

According to yet another aspect of the invention, the one or more alerts can include an email alert, a letter, a report, a telephone call or any other available means of communicating information. The property management system can also be property management system software. Furthermore, the utility data can include utility transaction information identifying the establishment of the utility service account or the termination of the utility service account. The utility data may also identify use of the utility service associated with the utility service account within approximately six days of the use of the utility service. According to one aspect of the invention, the one or more alerts are provided prior to a bill being printed by a utility service provider for use of the utility service, where the bill is associated with a period of time when the at least one tenant is responsible for payment of the utility service. Additionally, the notification module can include a computer program product.

According to another embodiment of the invention, there is disclosed a method for identifying utility theft. The method includes receiving tenant data from a property management system via a network, where the tenant data is associated with a property and identifies a tenant responsible for payment of a utility service associated with the property. The method also includes comparing the tenant data to utility data to determine if the tenant fails to correspond to a utility service account associated with the utility service, and providing one or more automated alerts identifying when the tenant fails to correspond to the utility service account.

According to one aspect of the invention, the method may be implemented by a computer-program product. The method can also include receiving utility data from a utility service provider. According to another aspect of the invention, the method can include configuring the one or more automated alerts via at least one graphical user interface, which may be Internet-accessible. Configuring the one or more automated alerts can also include configuring one or more automated alerts responsive to an instruction from an entity associated with the at least one property management system. The entity associated with the at least one property management system can also configure the timing and/or the type of the automated alerts. The automated alerts may be to an entity associated with the property management system, such as a property owner or manager, to a utility service provider providing the utility service, or to the tenant that fails to correspond to the utility service account.

According to yet another aspect of the invention, the one or more automated alerts comprise at least one of email alert, a letter, a report, a telephone call or any other available means of communicating information. The utility data may also include utility transaction information identifying the establishment of the utility service account or the termination of the utility service account. Further, the utility data can identify the use of the utility service associated with the utility service account within approximately six days of the use of the utility service by the tenant failing to correspond to the utility service account.

BRIEF DESCRIPTION OF THE DRAWINGS

Figure 1:
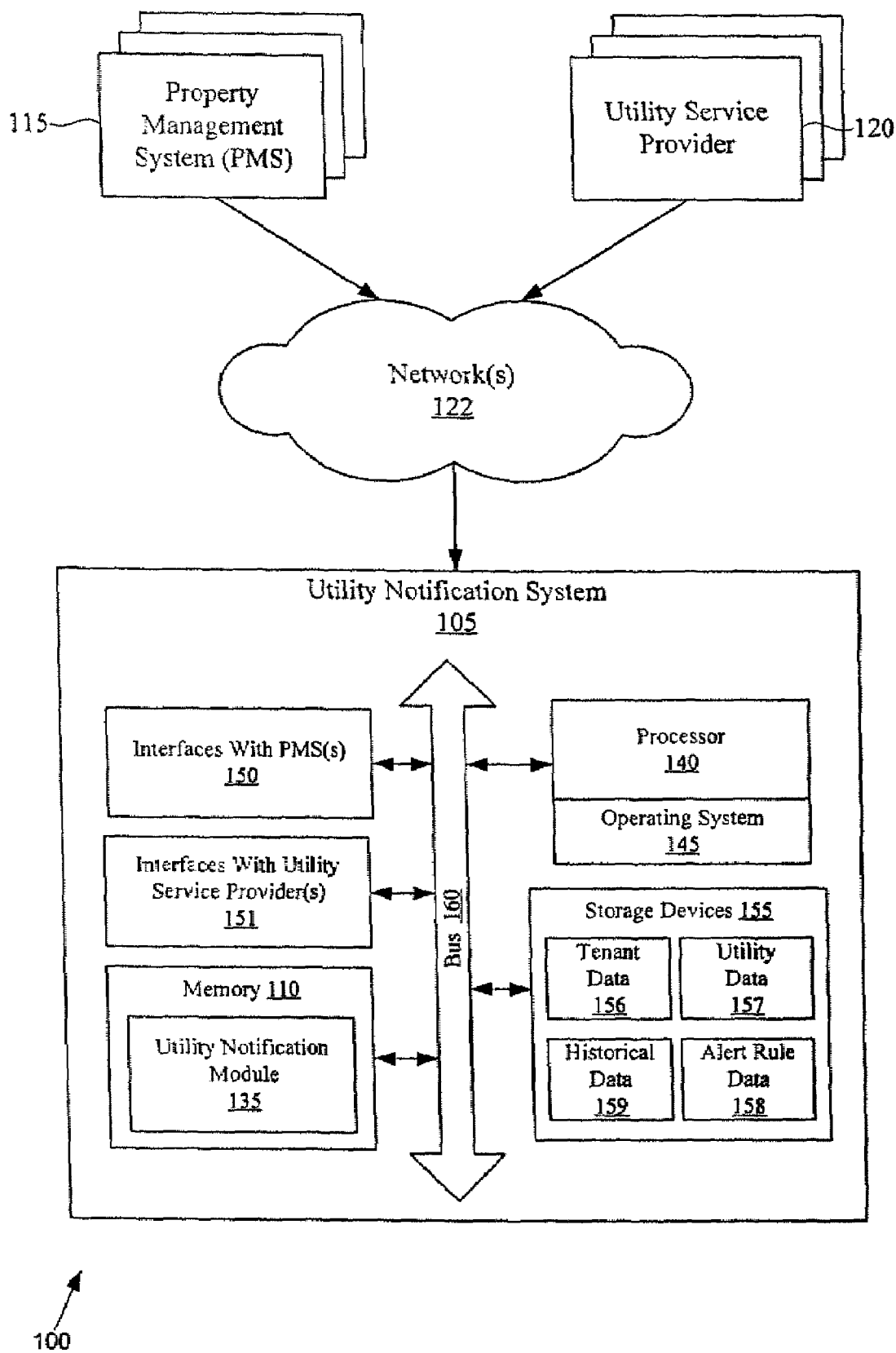

Having thus described the invention in general terms, reference will now be made to the accompanying drawings, which are not necessarily drawn to scale, and wherein:

FIG. 1 shows a utility theft elimination system in block diagram form, according to an embodiment of the present invention.

Figure 2:
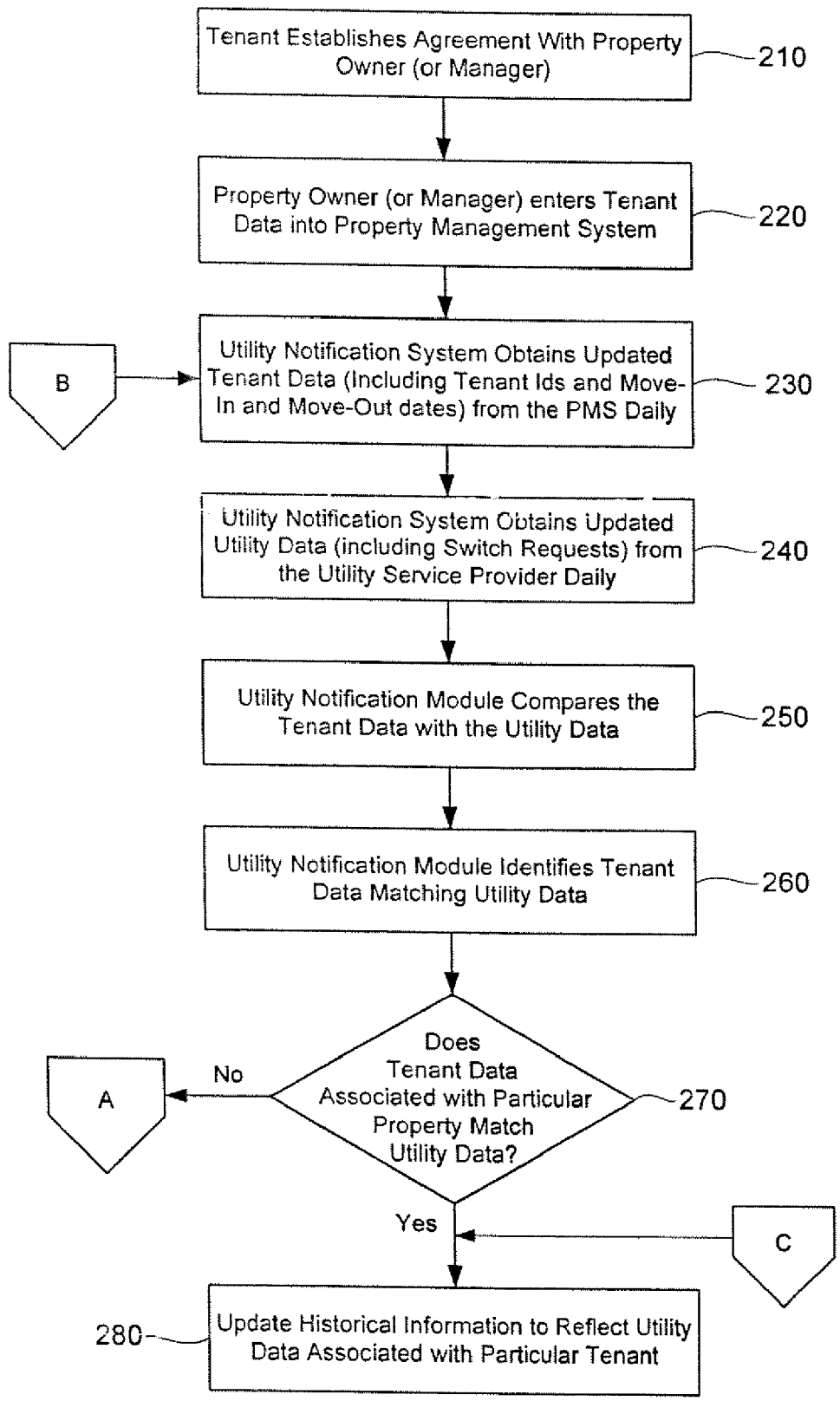
Figure 3:
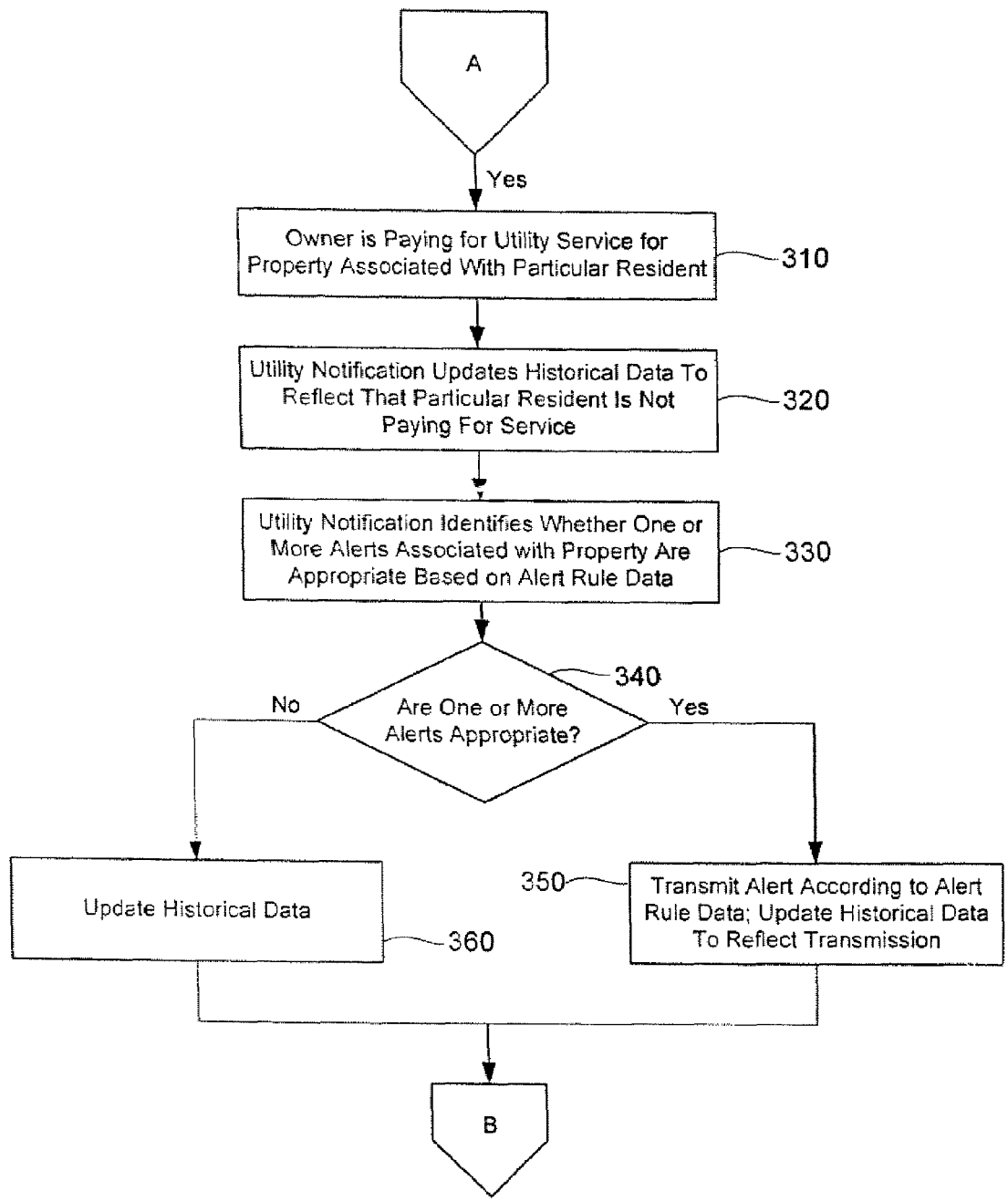

FIGS. 2 and 3 are block diagram flow charts illustrating a notification process performed in accordance with an illustrative embodiment of the present invention.

Figure 4:
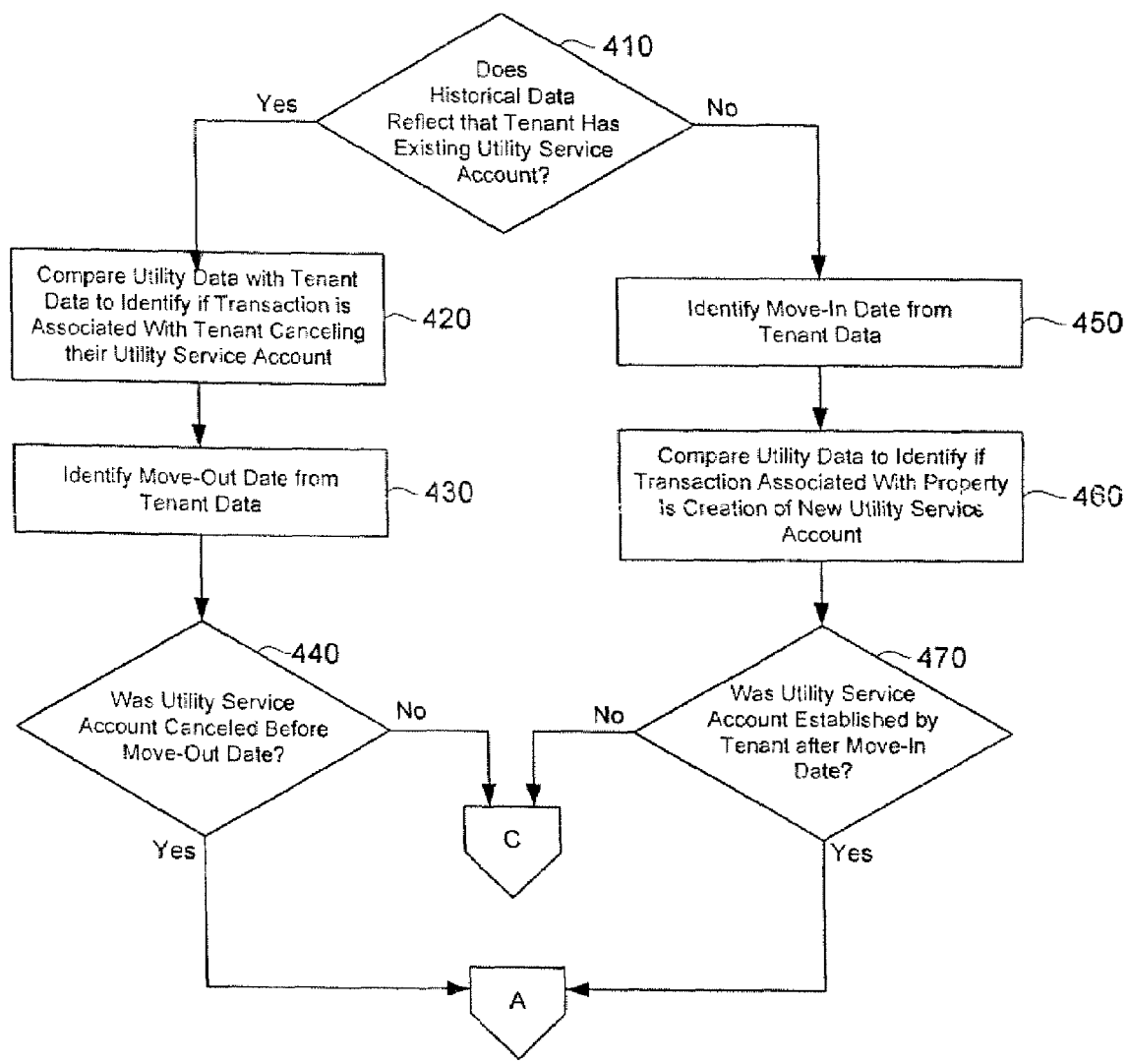

FIG. 4 shows a block diagram flow chart illustrating the matching of tenant data with utility data, according to an embodiment of the present invention.

FIGS. 5-16 show illustrative graphical user interfaces (GUIs) for controlling and configuring alerts and for generating reports, according to illustrative embodiments of the present invention.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The present invention is described below with reference to block diagrams and flowchart illustrations of systems, methods, apparatuses and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto one or more general purpose computers, special purpose computers, or other programmable data processing apparatuses to produce a system of one or more machines, such that the instructions that execute on one or more computers or other programmable data processing apparatuses create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Referring now to FIG. 1, a utility theft elimination system 100 in accordance with an illustrative embodiment of the present invention is shown. Generally, the utility theft elimination system 100 includes a utility notification system 105 that receives tenant data 156 associated with a property. The tenant data 156 is received via one or more networks 122, such as the Internet, from a property management system 115 associated with the property. The tenant data 156 identifies a tenant responsible for payment of a utility service associated with a utility service account. The tenant data 156 also includes the tenant's move-in and move-out date, the name of the property owner, and data identifying the tenant's property, such as unit number, building number, and/or another property identifier.

The utility notification system 105 also receives utility data 157 from one or more utility service providers 120, such as an electric or gas utility. Thereafter, the utility notification system 105, and more particularly the utility notification module 135 described in greater detail below, compares the tenant data 156 to the utility data 157 to determine if the tenant has taken responsibility for the utility service account. For instance, the utility notification module 135 will compare the utility data 157 to the tenant's property and move-in or move-out date to determine if the tenant has signed up for the utility service provider's services, as may be required by the tenant's agreement with the property owner. The utility notification module 135 can then provide one or more alerts identifying when the tenant fails to sign up for a utility service account or when the tenant cancels their existing utility service account. The timing and content of the alerts may be customized by the property owner or manager via an Internet accessible GUI. Additionally, the alerts may be configured for automatic transmission to the tenant, the property owner or manager, or the utility provider. The above functions will be described in greater detail below with respect to FIGS. 1-16.

As described above, the utility notification system 105 is in communication with the one or more property management systems ("PMSs") 115 and one or more utility service providers 120 via one or more networks, which can include the Internet. It will be appreciated that other networks, including any combination of local area networks (LANs) and wide area networks (WANs), may also be used. Additionally, according to an embodiment of the present invention, the utility notification system 105 may be maintained and operated by a utility service provider 120 and/or local to a utility service provider 120 such that a network between the utility service provider and utility notification system 105 is not required.

Although illustrated in FIG. 1 as communicating only with one or more PMSs 115 and utility service providers 120 it should also be appreciated that the utility notification system 105 may interface to systems associated with one or more utilities to obtain utility data. For instance, utility data 157 may also be obtained from a governing body that receives utility data from all of the utility service providers. An illustrative example of such a governing body is the Electric Reliability Council of Texas (ERCOT) in the State of Texas. Utility information may also be obtained from a transmission distribution service provider (TDSP), which manages electric lines and performs the hardware of a utility service. Of course these are merely exemplary, as there are a myriad of governing bodies involved depending on the type and location of the utility service. Communications with those entities and/or their respective systems may utilize the one or more networks 122 and/or may utilize one of more other networks (not illustrated) and/or dedicated communication links. Still other entities may provide utility data 157 to the notification system 105.

It will be appreciated that the methods of communicating with the utility notification system 105 may include any method well known to those of ordinary skill in the art. Thus, the present invention is not limited to a system in which the utility notification system 105 receives communications in a particular format or mode, or via particular hardware. For instance, although the present invention can be implemented by utilizing the Internet to facilitate communications directly between a particular PMS 115 and the utility notification system 105, any variety and/or combination of other communication methods can be used to interact with the utility notification system 105. For instance, according to one aspect of the invention, Electronic Data Interchange (EDI), as is known to those of ordinary skill in the art, may be used to collect the tenant and/or utility data. Other formats may also be implemented. Moreover, although not described in detail herein, it will be appreciated that some or all communications in the system 100 shown in FIG. 1 may be secure to maintain the confidentiality of data and to authenticate users of the utility theft elimination system 100.

As shown in FIG. 1, the utility notification system 105 includes at least one interface with the PMS(s) 150 to permit the utility notification system to collect tenant data from the one or more PMS(s) 115 on a daily basis. The interfaces with the PMS(s) 150 permit the utility notification system 105 to receive tenant data from PMS(s) 115 employing different software, data formats, communication protocols, and the like, as there are a number of different such systems employed in the market. Similarly, the utility notification system 105 includes one or more interfaces with utility companies 151 to permit the receipt of utility data from utility service providers 120 employing different software, data formats, communication protocols, and the like. It will also be appreciated that although the receipt of tenant and utility data is described herein as an automated process, such information may also be manually entered into the utility notification system 105.

The exemplary utility notification system 105 of the utility theft elimination system 100 also includes a processor 140, operating system 145, bus 160, and one or more storage devices 155 in addition to the interfaces 150, 151 and the aforementioned utility notification module 135 residing within a memory 110. The bus 160 includes data and address bus lines to facilitate communication between the processor 140, operating system 145 and the other components within the utility notification system 105, including the memory 110, the interfaces with the PMS(s) and the utility service provider(s) 150, 151 and the one or more storage devices 155. According to one aspect of the invention, the system 105 may represent a system of distributed components that are connected by the bus 106. The processor 140 executes the operating system 145, and together the processor 140 and operating system 145 are operable to execute functions implemented by the utility notification system 105, including executing software applications stored in the memory 110, as is well known in the art. The memory 110 may include random access memory, read-only memory, a hard disk drive, a floppy disk drive, a CD-Rom drive, a DVD-Rom drive, optical disk drive, or the like, for storing information on various computer-readable media.

Specifically, to implement the methods described herein, the processor 140 and operating system 145, with the utility notification module 135 and I/O interface(s) 150, receive commands and instructions and execute the functions described herein. Among other functions, these commands include configuration commands from an entity associated with a PMS 115, such as a property manager or property owner. The commands permit the type, timing and format of the alerts provided by the utility notification module 135. The configuration commands may also identify the recipient of the one or more alerts, which may include the tenant that has failed to take responsibility for payment of utilities, a property owner or manager, and/or a utility service provider. Other alerts include those related to cancellations, date changes, and property initiated shut-offs. According to one aspect of the invention, the utility service provider 120 may receive an alert instructing them to turn off the tenant's service, which could occur, for instance, when the tenant fails to respond to a previous alert. However, a previous alert is not required before such a communication with the utility and cut-off action is taken.

The utility notification module 135 is operable to store and retrieve data from the one or more storage devices 155, including tenant data 156 received from the one or more PMS(s) 115 and utility data received from one or more utility service providers 120. It should be appreciated that the tenant data 156 and utility data 157 may include data in the same format received from the one or more property management system(s) 115 and/or utility service providers 120. However, the tenant data 156 and utility data 157 can also include tenant data and utility data that is modified from the format received by the utility notification system 105. Thus, the interfaces with the PMS(s) and utility service providers and/or the utility notification module 135 may modify and store the tenant data 156 and utility data 157 in a format or different from that in which it is transmitted via the network 122. According to one aspect of the invention, all tenant data 156 and utility data 157 within the storage devices 155 can be converted to a common format, prior to storage, for later retrieval by the utility notification module 135.

The one or more storage devices 155 can also include historical data 159 and alert rule data 158. The historical data 159 can include any data generated by the utility notification module 135, such as utility service account status, alerts (or notices), status of alerts, historical information related to tenants and properties, utility-related data associated with a tenant or property (such as recovery expenses), and the like. Exemplary historical data includes data used to populate the illustrative GUIs of FIGS. 5-16, described in detail below. Thus, the historical data 158 includes the results of the comparison of tenant data and utility data 157 performed by the utility notification module 135 to identify those tenants that have not yet signed up for a utility service, but should have, or those tenants that have cancelled service earlier than permitted under a lease or similar agreement with a property owner or property manager. The historical data 159 may also include alerts of cancellations, date changes, and property initiated shut offs. According to one aspect of the invention, the historical data 159 includes records for each tenant associated with a property, where the records include up-to-date, utility specific information, as well as detailed information concerning alerts, tenant status, and recovery costs. According to one aspect of the invention described in detail below, pay-per-view information may include historical data 159. The generation of the historical data will be described in further detail below with reference to the block diagram flowcharts of FIGS. 2 and 3.

The alert rule data 158 can include data specifying the type, form, and content of alerts from each of the one or more property managers or owners. Thus, the alert rule data 158 may be customized by each property owner or manager to identify the number of days that should pass before an alert is transmitted, the type of alert transmitted, and the means by which an alert is transmitted. According to one aspect of the invention, the alert rule data 158 can be included within the historical data 159.

The one or more storage devices 155 are connected to the bus 160 by an appropriate interface and can include random access memory, read-only memory, a hard disk drive, a floppy disk drive, a CD-Rom drive, DVD-Rom drive, optical disk drive, or the like, for storing information on various computer-readable media, such as a hard disk, a removable magnetic disk, or a CD-ROM disk. In general, the one or more storage devices 155 provide non-volatile storage to the utility notification system 105.

The utility notification module 135 is further operable to provide GUIs that permit a user associated with the one or more PMS(s) 115, utility service provider(s) 120, and/or a third party operator of the utility notification system 105 to access, review, and modify the alerts transmitted to tenants that fail to sign up for utility service, or attempt to cancel service before they leave a property. The GUIs can also provide reports to property owners or property managers to indicate the utility status of all properties, including individual units. The utility status can include an identification of the person or entity responsible for a utility service for a particular property, as well as the dates of responsibility and whether utility service payments are up-to-date. Other GUIs are provided to effect the entry of the user commands described above. Thus, GUIs are available to permit a property owner or property manager to notify a utility service provider 120 that a utility service should be shut-down, or to customize the alerts, and to view and print statistical information related to the utility status of properties. Furthermore, the GUIs may be used by a property manager or third party to manually enter data, such as tenant data, utility data, and the like, which may allow use of the utility notification system 105 without the use of one or more PMS(s) 115 and/or utility service provider(s) 120. The function and purpose of the GUIs provided by the utility notification module 135 are described in more detail with respect to the illustrative GUIs described with respect to FIGS. 5-16.

It should be appreciated that although the utility notification module 135 is described herein as software residing within the memory 110, the utility notification module 135 may alternatively include a combination of software and hardware, or only hardware. Furthermore, although illustrated as located entirely within the utility notification system 105, one or more of the utility notification system 105 components can be distributed such that they are in whole or part external to the utility notification system 105. As an illustrative example, the one or more storage devices 155 may in fact be external to the utility notification system 105. Additionally, one or more of the files 156-159 within the one or more storage devices 155 may be located external to the utility notification system 105 and accessed remotely.

Further, it should be also appreciated by one of ordinary skill in the art that one or more of the utility notification system 105 components described with respect to FIG. 1 may comprise several components, which are either local to each other or which operate in conjunction with each other to permit the utility notification module 135 to perform the processes described herein. One or more of the utility notification system 105 components may also be combined and/or may be distributed on different computers, systems, platforms, and the like. Therefore, it should be appreciated that the illustrative system 100 shown in FIG. 1 is exemplary, and that almost any combination of software and/or hardware may be utilized to perform the functions described herein. The methods and processes implemented by the utility notification system 105 and the utility notification module 135 will next be described with reference to FIGS. 2 and 3.

Next, FIGS. 2 and 3 depict an exemplary notification process performed in accordance with an illustrative embodiment of the present invention. It will be appreciated that the notification process will be described with respect to a single tenant, PMS, and utility service provider. However, the process described with respect to FIGS. 2 and 3 may apply to one or more of any such parties. The process commences with the establishment of an agreement, such as a rental or lease agreement, with a property owner or manager (block 210). The property owner or manager will then enter the tenant data into a PMS (block 220). Next, the PMS transmits or permits access to tenant data (block 230). This can be the result of a request for the tenant data from the utility notification system 105, which may occur at regular intervals such as daily, or the result of a scheduled push of information to the utility notification system. Additionally, it will be appreciated that because the utility notification system 105 may reside wholly within a PMS, the tenant data may already exist in a database local to the PMS such that retrieval is not required. The tenant data includes the tenant's move-in and move-out dates, the name of the property owner, and data identifying the tenant's property, such as unit number, building number, and/or another property identifier. This information can be stored by the utility notification module 135 as tenant data 156 within the one or more storage devices 155.

The utility notification system 105 thereafter obtains updated utility data from the utility service provider (block 240). According to one aspect of the invention, the updated utility data includes any updated (i.e., new or altered) utility data not previously received by the utility notification system. The updated utility information can include, among other information, the identity of a property, the name or identity of a tenant, whether utility service has been established or cancelled. The identification of whether utility service has been established or cancelled for a tenant in a particular property may include a switch request, where the switch request identifies the establishment of new service or the cancellation of service by a tenant for a particular property. Other information that may be obtained includes the name and identity of the utility service provider, though that data may be received separately from the utility notification system 105. Similar to the tenant data, the utility data can be stored by the utility notification module 135 as utility data 157 in the one or more storage devices 155.

According to one aspect of the invention, only updated utility data (representing only new or altered data) is transmitted to the utility notification system 105, which can reduce the volume of content and the bandwidth required for such content. It can also reduce the amount of processing required to compare the utility data to tenant data, as is described below. Similar to the tenant data, the utility data may be pushed or pulled from the utility service provider at a regular interval, such as daily. According to yet another aspect of the invention, the utility notification system 105 could be part of or managed by a utility service provider such that the utility data need not be transmitted to the utility notification system because it is already stored and available to the utility notification module 135 for processing.

Next, the utility notification module 135 compares the tenant data with the updated utility data (block 250) to identify tenant data that matches utility data (block 260). The comparison of tenant data and updated utility data is discussed in detail with respect to FIG. 4. As shown in FIG. 2, if the tenant data associated with a particular property matches the updated utility data (block 270), then the utility notification module 135 updates the historical data 159 to reflect the utility data associated with a particular tenant (block 280). That historical data may be subsequently accessed by the utility notification module 135 to generate GUI reports and the like. A match occurs when the resident has switched a utility after move-in or has an existing utility services account that has not been cancelled prior to the tenant's move-out date.

When tenant data fails to match the utility data (block 270), the owner is paying for the utility service associated with a particular resident (block 310). This information is updated in the historical data 159 (block 320) so that it may be presented to a property owner, property manager, utility service provider, or tenant via a GUI or via an alert that can include an email alert, a letter, a report, a telephone call or any other available means of communicating information. Next, the utility notification module 135 identifies whether one or more alerts associated with a property are appropriate based on alert rule data 158 stored in the one or more storage devices 155 of the utility notification system 105. Alert rule data may be stored for each property manager or owner, and identifies when an alert will be sent to a tenant. Alert rule data also controls the type and format of an alert transmitted to a tenant.

According to one aspect of the invention, the alert rule data permits a property manager to choose a grace period from move-in date before an alert is sent to a tenant that has failed to create a utility service account. For instance, using one or more GUIs described below, a property manager or property owner may choose to send alerts only after a grace period, such as 5, 7 or 10 days. As another illustrative example, a property owner or manager may configure multiple alerts to occur after the passing of consecutive deadlines. For instance, for a tenant that fails to create a utility service account after move-in, an email alert might be sent to the tenant 5 days from the tenant's move-in date, and a letter may be sent after 7 days. Each may have content customized by the property manager or property owner via one or more GUIs generated by the utility notification module 135. Therefore, in determining whether an alert is necessary, the utility notification module compares the tenant data, such as move-in date, with the present date and the rules established by the property owner or manager corresponding to the tenant. It will be appreciated that the use of individual records of alert rule data 158 for each property manager or owner permits customization of the system.

If the utility notification module 135 determines if one or more alerts are appropriate (blocks 330, 340), then the one or more alerts are transmitted according to the alert rule data (i.e., the type, content, and recipient) and the historical data is updated to reflect their transmission (block 350). Among other types of alerts, the utility notification system 105 is operable to transmit a communication, on behalf of a property owner, to the utility service provider 120 indicating that the utility service account is not the responsibility of the property owners, and that the utility service associated with the account should be shut off. On the other hand, if one or more alerts are not appropriate (block 340), then the historical data 159 is updated to reflect that the tenant data does not match the utility data, but that alerts have not been transmitted (block 360). This information may be presented to a property owner or manager via one or more GUIs.

Next, FIG. 4 shows a detailed view of a process for determining whether tenant data (associated with a particular property) matches utility data (block 270). If the historical data reflects that the tenant has an existing utility service account (block 410), then the utility notification module 135 will ascertain whether the tenant has switched off their service prior to their move-out date, which could result in one or more alerts described above. In that event, the utility notification module 135 will compare the utility data with tenant data to identify if a transaction (within the utility data) is associated with the tenant that is canceling their utility service account before the move-out date (block 420). Thereafter, a move-out date is identified (block 430) and the utility notification module 135 determines whether the utility service account was canceled before that date (block 440). If so, the process continues at block 310 of FIG. 3. On the other hand, if the utility service account was not canceled, then the historical data is updated to reflect a tenant in good standing, as shown in block 280.

If the historical data reflects that the tenant does not have an existing utility service account (block 410), then the utility notification module 135 will identify the tenant's move-in date from the tenant data (block 450) and will compare the utility data with tenant data to identify if a transaction (within the utility data) is associated with the tenant that is creating (or taking over) a new utility service account (block 460). Thereafter, the utility notification module 135 determines whether the utility service account was established after the move-in date (block 470). If so, the process continues at block 280 of FIG. 2. On the other hand if the utility service account was not established, then the process continues with block 310 of FIG. 3.

Next, FIGS. 5-16 show illustrative GUIs to permit customization of automated alerts, including the timing of the alerts, the alert recipients, the number of alerts, and the format or type of alerts. The customization of such information is stored as alert rule data 158, as described above. The GUIs also permit the review of historical data and the generation of reports. According to one aspect of the invention, the GUIs may be Internet-accessible. However, the GUIs may also be provided locally and accessed directly from a single computer. According to still another aspect of the invention, the GUIs may be stored locally and accessed remotely, such as in an Application Service Provider type model. It will be appreciated that the GUIs are illustrative only, and that many alternative GUIs may provide the functions described below with respect to FIGS. 5-16.

FIG. 5 shows a not switched GUI 500 that permits the viewing of the switch status for tenants who have not yet taken responsibility for a utility services account. The GUI 500 generally includes a property navigation window 510 and a historical data window 520. The property navigation window 510 permits a valid user access to historical data, tenant data, and utility data associated with one or more properties the user is entitled to view. According to one aspect of the invention, a user is previously identified via an authentication process, which can require a username and password log-in (not illustrated).

In the illustrative GUI 500, tenants that have not yet taken responsibility for a utility services account for one or more properties selected using the property navigation window 510 are shown in the historical data window 520. Each individual property, such as each individual unit or property associated with one or more tenants, is shown as a line-item record in the GUI 500. The information for each includes an identification of the property, the tenant (or resident), the move-in date, the switch date (if requested), the number of days past the move-in date for which the tenant has failed to effect a switch of the utility account service, the potential recovery expense by a property owner or property manager, the status of the utility service account, and the date of the last notice, as well as the number of notices that have been sent. The information also includes check boxes permitting a property manager or owner to ignore the record, which can remove it from the window 520, or to choose to send a shut off request to the utility service provider. According to one aspect of the invention, the shut off request check box may only be presented subsequent to the issuance of a number of notices, such as three notices. If the shut off check box is selected, then the user is presented with the shut off request GUI described below with respect to FIG. 14.

FIG. 6 shows an early switch GUI 600 that is similar to the not switched GUI 500 of FIG. 5. The early switch GUI 600 also provides a valid user access to historical data, tenant data, and utility data associated with one or more properties the user is entitled to view, and may be accessed via one or more early switch tabs 640 from the not switched GUI 500 of FIG. 5. Likewise, the not switched GUI 500 may be accessed from the early switch GUI 600 of FIG. 6 via one or more selectable not switched tabs 530. The early switch GUI 600 also includes the property navigation window 510 and the historical data window 520. The historical data window displays those tenants that have requested a switch in their utility service account, such as a cancellation of the account, prior to their move-out date. The information for each includes an identification of the property, the tenant (or resident), the move-out date, the switch date requested by the tenant, the number of days before the move-out date in which the tenant requested an early switch, the potential recovery expense by a property owner or property manager, the status of the utility service account, and the date of the last notice, as well as the number of notices that have been sent. The information also includes check boxes permitting a property manager or owner to ignore the record, which can remove it from the window 520, or to choose to send a shut off request to the utility service provider. Similar to the not switched GUI 500 of FIG. 5, the shut off request check box may only be presented subsequent to the issuance of a number of notices, such as three notices. If the shut off check box is selected, then the user is presented with the shut off request GUI 1400 described below with respect to FIG. 14.

FIG. 7 shows a pay-per-view not switched GUI 700 according to an illustrative aspect of the invention. The GUI 700 presents the same information as the not switched GUI 500 in that it permits the viewing of the switch status for tenants who have not yet taken responsibility for a utility services account. However, unlike the not switched GUI 500 of FIG. 5, the pay-per-view not switched GUI 700 withholds some of the historical data, tenant data, and utility data associated with one or more properties the user is entitled to view until a user chooses to purchase the information via a link, such as a the "Buy Now" link. This permits the present invention to identify that the property manager could identify problem tenants quickly, but only after the payment of a fee. Although shown only with respect to the not switched feature, the pay per view feature of the present invention could be enabled for the early switch GUI 600 as well, and for any other GUI in which a property manager or owner wishes to view historical data, tenant data, and/or utility data associated with one or more properties.

Figure 8:

FIG. 8 shows a unit search GUI 800 that permits a user, such as a property manager or property owner to search for a company, property, unit, or resident. FIG. 9 shows a detailed record view GUI 900 for a particular resident. The GUI 900 includes a history window 910 that shows move-in dates, move-out dates (if applicable), notices, and related comments that may be entered by an authorized user. The detailed record view GUI 900 also includes notice addressee information 920, including email, phone, address and property information for a tenant at a particular property. A user can quickly view whether a notice has been sent using one or more notice methods (i.e., email, hand delivery, phone, address, etc.), can view such notices, and can also use select boxes to instruct the utility notification module 135 to transmit and alert (or notice) to a tenant using one of the variety of alert methods.

FIG. 10 shows a company administration GUI 1000 that permits detailed company information to be entered into and stored by the system 105. The company information may correspond to a property owner or property manager. The company administration GUI 1000 also permits customization of the GUIs made available to the company, including a billing method (i.e., whether pay-to-view is appropriate), and notice levels. Similarly, FIG. 11 shows a property administration GUI 1100 that permits detailed property information to be entered into and stored by the system 105, and FIG. 12 shows a unit administration GUI 1200 that permits detailed unit information to be entered into and stored by the system 105. According to one aspect of the invention, the company, property and unit information (or data) may be stored as historical data, although the data may also be stored in another location in the one or more storage devices 155. Additionally, the unit history GUI 1300 of FIG. 13 permits an authorized user to view the tenants (or residents) of a particular property, which may be useful in recovering utility service expenses related to a particular unit.

FIG. 14 shows a shut off request GUI 1400. The GUI 1400 shows each unit that will be disconnected from a utility service as the result of an action performed on another screen. According to one aspect of the invention, the shut off request GUI 1400 is a verification screen that is presented, or pops-up, when an action taken on another screen requests that a utility service account be disconnected. For instance, selection of a shut off request check box in the not switched GUI 500 of FIG. 5 may result in the shut-off request GUI 1400 being provided to the user. By selecting to disconnect a user, the utility notification module 135 will transmit a communication to the appropriate utility service provider to shut down a particular service.

Figure 15:

FIGS. 15 and 16 show report GUIs 1500, 1600 that may be provided to property owners by the utility notification system 105. Among other items, these reports may illustrate the number of properties for which collections may be made for failure of a tenant to pay for utility service.

Many modifications and other embodiments of the inventions set forth herein will come to mind to one skilled in the art to which these inventions pertain having the benefit of the teachings presented in the foregoing descriptions and the associated attachments. Therefore, it is to be understood that the inventions are not to be limited to the specific embodiments disclosed and that modifications and other embodiments are intended to be included within the scope of the present disclosure. Although specific terms are employed herein, they are used in a generic and descriptive sense only and not for purposes of limitation.

That which is claimed:

1. A system for identifying utility theft for an entity under a Continuous Service Agreement with a utility company, where the utility service is never turned off such that the entity may legally use utility services while a premise is vacant, comprising:
    at least one property management system, wherein the at least one property management system is operable to receive tenant data associated with a property, wherein the tenant data includes at least one of a lease start date or actual move-in date and at least one of an expected move-out date or an actual move-out date for tenants occupying the premises of the entity;
    at least one utility service provider, wherein the utility service provider is operable to transmit utility data associated with the premise;
    a notification system in communication with the at least one property management system and at least one utility service provider, wherein the notification system is operable to:
    receive the tenant data, wherein the tenant data includes at least one of the lease start date or actual move-in date and at least one of an expected move-out date or the actual move-out date, from the at least one property management system via at least one network, wherein the tenant data identifies at least one tenant responsible for a utility service and the period of responsibility associated with a utility service account; receive utility data from the at least one utility service provider for the entity, and
    automatically compare at least one of the lease start date or the actual move-in date, and at least one of the expected move-out date or the actual move-out date to the utility data to identify the unauthorized use of utility services under the Continuous Service Agreement of the entity with at least one of the utility service providers; and
    a notification module, wherein the notification module is operable to provide one or more alerts identifying when the unauthorized use of utility services is detected.

2. The system of claim 1, wherein the notification module is accessible, via a network, to an entity associated with the at least one property management system.

3. The system of claim 2, wherein the entity associated with the at least one property management system is operable to configure the one or more alerts identifying when the at least one tenant fails to correspond to the utility service account.

4. The system of claim 1, wherein the notification module is operable to automatically provide the one or more alerts to an entity associated with the at least one property management system or the utility service provider.

5. The system of claim 1, wherein the notification module is operable to automatically provide the one or more alerts to the at least one tenant that fails to correspond to the utility service account.

6. The system of claim 1, wherein the notification module comprises at least one internet accessible graphical user interface facilitating the configuration of the one or more alerts.

7. The system of claim 1, wherein the utility data comprises utility transaction information identifying the establishment of the utility service account or the termination of the utility service account.

8. The system of claim 1, wherein the utility data identifies use of the utility service associated with the utility service account within approximately six days of utility service initiation.

9. The system of claim 1, wherein the one or more alerts are provided prior to a bill being printed by a utility service provider for use of the utility service, where the bill is associated with a period of time when the at least one tenant is responsible for payment of the utility service.

10. The system of claim 1, wherein the notification module is operable to provide one or more alerts identifying when the at least one tenant fails to correspond to the utility service account only after payment for the alert.

11. A method for identifying utility theft, comprising:
    receiving utility data from a utility service provider;
    receiving tenant data from a property management system;
    automatically comparing the tenant data, wherein the tenant data includes the tenant's name, address, at least one of a lease start date or actual move-in date, and at least one of an expected move-out date or an actual move-out date for tenants occupying the premises that identifies a tenant responsible for a utility service associated with a property to utility data, to determine based at least in part on at least one of the start date or actual move-in date, and at least one of the expected move-out date, or actual move-out date if the tenant fails to correspond to a utility service account associated with the utility service; and
    providing one or more automated alerts identifying when the tenant fails to correspond to the utility service account.

12. A computer-program product for implementing the method of claim 11.

13. The method of claim 11, further comprising configuring the one or more automated alerts responsive to an instruction from an entity associated with the property management system.

14. The method of claim 13, further comprising configuring the one or more automated alerts via at least one graphical user interface.

15. The method of claim 11, wherein providing one or more automated alerts comprises providing the one or more alerts to an entity associated with the property management system or to the tenant that fails to correspond to the utility service account.

16. The method of claim 11, wherein the utility data comprises utility transaction information identifying the establishment of the utility service account or the termination of the utility service account.

17. The method of claim 11, wherein the utility data identifies use of the utility service associated with the utility service account within approximately six days of the use of the utility service.

18. The method of claim 11, further comprising requesting payment prior to providing the one or more automated alerts identifying when the tenant fails to correspond to the utility service account.

19. A system for identifying utility theft for an entity under a continuous service agreement with a utility service provider, where the utility service is not turned off during the term of the continuous service agreement such that the entity may legally use utility services while a premise is vacant, comprising:

a notification system in communication, via at least one network, with the at least one property management system and the utility service provider, wherein the notification system is configured to:

receive, from the utility service provider, utility data associated with the premise;

receive, from the at least one property management system, tenant data associated with a property, wherein the tenant data includes at least one of a lease start date or actual move-in date and at least one of an expected move-out date or an actual move-out date, and wherein the tenant data identifies at least one tenant responsible for a utility service and the period of responsibility associated with a utility service account;

automatically compare at least one of the lease start date or the actual move-in date, and at least one of the expected move-out date or the actual move-out date to the utility data to identify the unauthorized use of utility services under the Continuous Service Agreement of the entity with at least one of the utility service providers; and provide one or more alerts identifying when the unauthorized use of utility services is detected.

* * * * *